May 14, 1957 R. C. FERGASON 2,791,877
COTTON PICKING SPINDLE
Filed Aug. 5, 1955
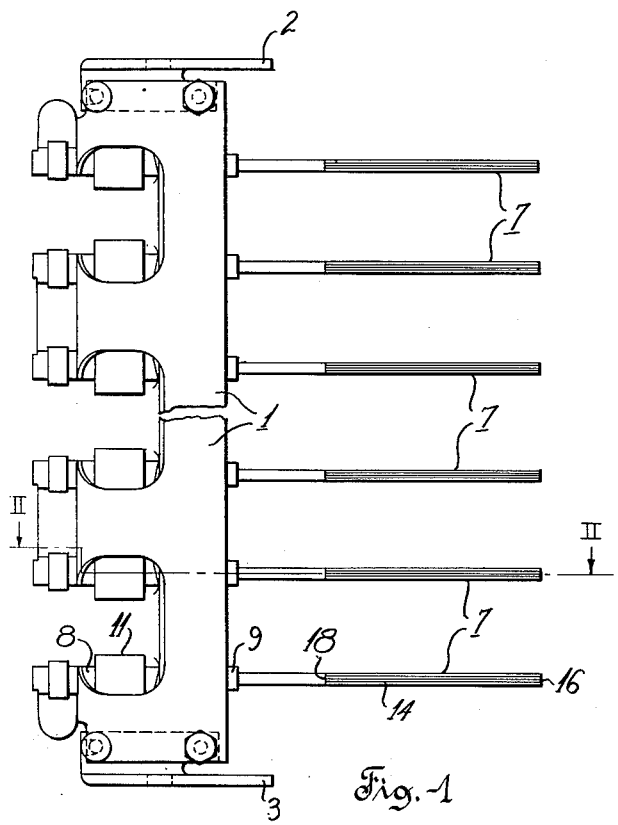
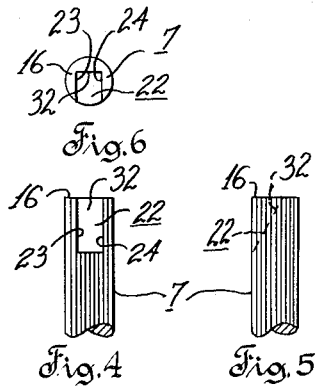
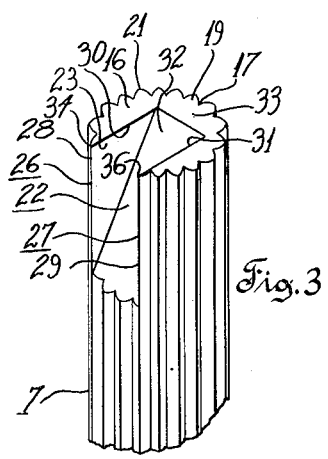
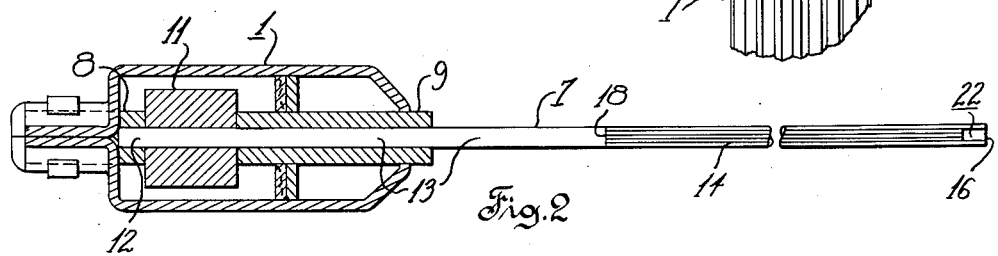
Inventor
Rector C. Fergason
by Donald C. McGaughy
Attorney United States Patent Office 2,791,877
Patented May 14, 1957

2,791,877

COTTON PICKING SPINDLE

Rector C. Fergason, Gadsden, Ala., assignor to Allis-Chalmers Manufacturing Company, Milwaukee, Wis.

Application August 5, 1955, Serial No. 526,663

5 Claims. (Cl. 56—50)

This invention relates to cotton picking spindles and more particularly to cotton picking spindles of the type which are introduced into the cotton while rotating about their longitudinal axis.

Cotton picking spindles as heretofore used have been of two general types, one being a generally rodlike cylindrical element which lends itself for use with a stationary cotton stripping mechanism and the other a generally conical studlike element having a barbed picking portion and which requires a rotary doffer to remove the cotton therefrom. The present invention lends itself equally well for use with both of the spindle types outlined above.

In operation the spindles are rotatably mounted in spindle carrying slats and carried about a generally oval path. On one side of the oval path the spindles are carried into and through a picking tunnel in a rearward direction where they are rotated at a relatively high rate of speed which causes the cotton to wind upon the spindles and be removed from the plants. The cotton loaded spindles then pass out of the picking tunnel and then about the other side of the oval path. As the spindles travel forwardly along the other side of the oval path the cotton is removed therefrom by means of a stationary comb-like cotton stripping mechanism or a rotary doffing mechanism.

It is readily apparent that it is desirable that the spindles have a maximum of cotton gripping qualities or aggressiveness as it is commonly termed so as to insure winding of the cotton thereon during passage through the picking tunnel. The aggressiveness of the picking portion may be achieved in many ways, as for example by providing barbs thereon, by roughing with abrasive wheels, fluting the picking portion, or by applying moisture thereto. While aggressiveness of the entire picking portion of the spindle is helpful to efficient picking, the most effective portion of the picking spindle is the outer tip or end of the picking portion. This is due to the fact that the tip of the spindle is the first portion moved into contact with the bolls of cotton as the spindles are carried into the picking tunnel. As a practical consequence the tip is subject to greater wear than the rest of the picking portion and the aggressiveness of the tip of the spindle tends to be reduced more rapidly than that of the remainder of the spindle. As the spindle tip wears smooth and loses aggressiveness a consequent loss in the picking efficiency of the spindle occurs.

Various expedients have been heretofore suggested for maintaining the aggressiveness of the spindle tip without reducing the stripping qualities thereof. For example, it has been suggested to provide the spindle tip with forked pointed barbs which provide the desired aggressiveness of the tip. This type of provision has not been entirely satisfactory however, particularly in the matter of reasonable resistance to wear and breakage. Spindles of the above outlined character are customarily rotated at speeds exceeding 1200 R. P. M. and the barbs upon encountering cotton stalks are subjected to impact loads. Such loading may frequently result in bent or broken barbs which reduces the picking efficiency and which may require replacement of the spindle.

Another shortcoming of the forked spindle tip mentioned above is its affinity for gathering grass, vines and the like. During rotation the notch between the forked barbs aligns with the longitudinal extent of the grass blades and receives them therebetween. Further rotation winds the grass upon the spindle and makes it available to the receptacle. The presence of grass and the like in the harvested cotton is undesirable particularly due to the fact that it reduces the grade of cotton and consequently the price it will bring at the gin. While an aggressive spindle tip is desirable, its aggressiveness should be directed to the cotton and not to such foreign material as grass. It is desirable then that the spindle tip be constructed to minimize the tendency of gathering foreign material such as grass while remaining agressive to the cotton.

Generally, it is an object of this invention to provide an improved cotton picking spindle which will take care of the hereinbefore outlined requirements in a practical and fully satisfactory manner.

More specifically, it is an object of this invention to provide a cotton picking spindle tip construction which maintains its effective aggressiveness over a longer period of time.

A further object of this invention is to provide an improved cotton picking spindle tip construction which will provide a high degree of aggressiveness without decrease of the ease with which the cotton may be stripped or doffed from the spindle.

Another object of this invention is to provide an improved cotton picking spindle tip construction of the hereinabove outlined character having a reinforced barbed type construction affording maximum resistance to impact and shear loads.

Another object of this invention is to provide an improved cotton picking spindle tip of the hereinabove outlined character in which grass gathering tendencies are reduced to a minimum.

A still further object of the invention is to provide an aggressive spindle tip which is simple and compact in construction, efficient in operation, which may be manufactured at a minimum of cost and which may be applied to spindles of the above mentioned type as have been heretofore used.

These and other objects and advantages are attained by the present invention, various novel features of which will be apparent from the description herein and the drawings disclosing an embodiment of the invention, and as will be more particularly pointed out in the appended claims.

Referring to the drawings:

Fig. 1 is a fragmentary side view of a slat structure mounting a series of spindles constructed in accordance with the present invention;

Fig. 2 is an enlarged fragmentary sectional view on line II—II of Fig. 1, showing one of the spindles at somewhat less than full length;

Fig. 3 is an enlarged isometric projection of the spindle tip shown in Fig. 2;

Fig. 4 is an enlarged front elevational view of the spindle tip shown in Fig. 2;

Fig. 5 is an enlarged side elevational view of the spindle tip shown in Fig. 2; and Fig. 6 is an enlarged plan view of the spindle tip shown in Fig. 2.

Referring to Figs. 1 and 2, the reference character 1 is used to designate generally, a cotton picker slat structure of conventional construction. In conformity with general practice, a number of these salts are pivotally mounted, by means of upper and lower hinge elements 2 and 3 to upper and lower endless chains or belts (not shown) for travel in an oblong path. As is well known, each slat 1 rotatably supports a vertically spaced series of horizontally extending spindle rods or picking elements 7 by means of inner and outer bearings 8 and 9, respectively. In operation the slats and spindle rods are carried about the oblong path past a moistening mechanism (not shown) and then through a picking area or tunnel where the spindles are rotated to gather cotton. The cotton loaded spindles are then carried through a stationary cotton stripping device where the picked cotton is removed or stripped longitudinally from the spindle rods 7, all of which is well known in the art.

Further details of the construction and operation of a cotton picking unit of the above outlined type utilizing the rodlike picking spindles may be had by reference to my U. S. Patent 2,671,298, issued March 9, 1954.

It is to be understood that while the invention as disclosed is embodied in the rodlike cylindrical spindle element shown in Fig. 2 it will be appreciated that the invention would be applied to the generally conical stud-like spindle element in a similar manner. The spindle rod 7 shown in Fig. 2 forms an elongated cylindrical element of substantially uniform diameter throughout its length. In addition to the rod 7, each spindle also includes a separately formed cylindrical drive roller 11 which is nonrotatably and axially fixed to the rod 7 adjacent to but at some axial distance from one end thereof. The portions of the rod 7 which extend axially from opposite sides of the drive portion 11 present smooth cylindrical surfaces 12, 13, respectively, about which the bearings 8 and 9 are rotatably mounted. The portion of the spindle rod 7 which extends outward from the outer bearing 9, that is, toward the right in Fig. 2, includes part of the smooth cylindrical portion 13 and an active or picking portion 14 which continues to the end of the spindle rod 7. The active portion 14 is of substantially the same diameter as the smooth cylindrical portion 13 and has its peripheral surface interrupted by a plurality of minute longitudinally extending flutes 17, best appearing in Fig. 3. These flutes extend longitudinally inward from the outer end surface 16 of the spindle toward the outer bearing 9 and terminate at an intermediate portion 18 of the spindle rod 7.

With reference to Fig. 3, it will be noted that the minute flutes 17 are closely and uniformly spaced circumferentially of the spindle rod 7. The fillets 19 which lie between the flutes 17 are substantially linelike extensions of the smooth cylindrical surface 13. Due to the fact that the flutes 17 extend longitudinally of the spindle there is substantially no lessening of the ease with which the cotton may be stripped longitudinally of the picking spindle. It will be understood that while the fluted construction is not necessary to the practice of the present invention, the flutes do provide a more aggressive picking surface and enable the spindle to more efficiently retain the moisture which is applied thereto prior to its entrance into picking relation to the bolls of cotton.

Referring in particular to Figs. 3 and 4 it will be noted that the end surface 16 extends at right angles to the longitudinal extent of the spindle rod or element 7. The peripheral edge 21 of the end surface 16, though slightly serrated by the fluted surface construction of the spindle rod, may be described as generally circular. As best appears in Fig. 3 the edge 21 is interrupted at one side or portion by an indent 22 which extends radially inward from the peripheral edge to a depth which is less than the diameter of the spindle rod 7. The indent, bordered by a pair of generally parallel spaced side walls 23 and 24, extends longitudinally of the spindle 7 to define a pair of reinforced longitudinally extending cotton engaging members 26 and 27, respectively. It will be noted that the side walls of members 26 and 27 have sharp cotton gripping edges 28 and 29 on the periphery of the picking portion. These edges 28 and 29 are reinforced by the stock of material remaining on each side of side walls 23 and 24. In addition, the indent does not disturb the cylindrical configuration of the spindle rod 7 and accordingly does not interfere with the stripping qualities of the spindle. The indent 22 opens through the end surface 16 with side walls 23 and 24 terminating in generally transverse cotton gripping edges or end margins 30 and 31. The end margins 30, 31 intersect the edges 28, 29 at points 34 and 36 on the peripheral edge 21 of the spindle. The indent 22 diminishes in depth as it extends longitudinally inward from the end surface 16 until it reduces to nothing at the point on the spindle rod at which the base surface 32 of the indent 22 intersects the peripheral surface of the spindle. Since the most effective picking portion of the spindle rod is the tip or outer end the indent 22 is confined to this region, thereby retaining the structural strength of the spindle. It is to be understood that the indent could extend longitudinally of the picking portion and throughout its length.

In operation the spindle is rotated at a relatively high rate of speed; i. e., 1200 R. P. M. and the tip thereof is usually the first portion of the spindle which is presented in contact with the cotton plant. Aggressiveness of the spindle tip is important to efficient picking of cotton and under normal picking conditions the peripheral edge 21 of the end surface 16 soon rounds off and becomes polished due to wear. The indented tip construction minimizes the effect of wear on the aggressiveness and picking efficiency of the spindle by providing a pair of reinforced cotton engaging members 26 and 27 which are located within the cylindrical configuration of the spindle and which therefore are not subject to rapid wear. As the rotating spindle tip contacts a boll of cotton the fiber thereof will hairpin over one of the points 34 or 36 of one of the cotton engaging members 26 or 27 and become wedged into the indent 22. It will be readily apparent that both the circumferential width and the radial depth of the indent 22 must be of such dimension as to readily accommodate the cotton therein. It is obvious that the indent may be of such minute size that the nature of the cotton fiber could not permit the desired hairpinning or wedging in the indent 22. Should the circumferential width be too narrow the cotton will not hairpin over the edges 28 and 29. Similarly if the radial depth is too shallow the cotton will not wedge or hold as effectively in the indent. Satisfactory results may be obtained through the use of an indent having a circumferential width and radial depth at least equal to one third of a 3/16 inch diameter picking spindle.

It will be noted by reference to Fig. 3 that the indent 22 does not extend across the entire diametrical extent of the spindle. This unremoved or bridging portion 33 serves an important function in the operation of the spindle rod 7. A spindle tip having a conventional slotted or forked type construction has the very definite condition of allowing grass and/or vines and the like to slide into the slot when the latter is rotated into alignment with longitudinal extent of the blades. Such foreign material is removed or stripped from the spindle along with the cotton and passed to the receptacle. The interruption of the periphery 21 at only on point as provided by indent 22 provides an aggressive spindle tip that does not have a tendency to grip and gather grass. As a consequence of the bridging portion 33 the tip of the spindle does not have a diametrically extending slot which can align with and receive blades of grass. It will be understood that the bridging portion 33 aids in rejecting the grass as it closes the periphery of the spindle tip at a point opposite the indent 22 thereby preventing the grass from entering the indent when the latter is aligned with the longitudinal extent of the blades.

It should be understood that it is not intended to limit the invention to the particular forms and details described It is claimed and desired to secure by Letters Patent:

1. A cotton picking spindle comprising an elongated element of substantially cylindrical cross section throughout its length and having a picking portion terminating in an end surface extending at a right angle to said element, said end surface having a generally circular peripheral edge interrupted at only one portion thereof by an indent defined by spaced side walls, each of said walls having a cotton gripping edge on the periphery of said picking portion and a cotton gripping edge on said end surface.

2. A cotton picking spindle comprising an elongated element of substantially cylindrical cross section throughout its length and having a picking portion terminating in an end surface extending at a right angle to said element, said end surface having a generally circular peripheral edge interrupted at only one portion thereof by an indent bordered by spaced side walls, each of said walls having a cotton gripping edge on the periphery of said picking portion and a generally transverse cotton gripping edge on said end surface to define a pair of spaced generally longitudinally extending reinforced cotton gripping members.

3. A cotton picking spindle comprising an elongated element of substantially cylindrical cross section throughout its length and having a picking portion terminating in an end surface extending at a right angle to said element, said end surface having a generally circular peripheral edge interrupted at only one porton thereof by an indent bordered by spaced side walls extending longitudinally of said picking portion, each of said walls having a cotton gripping edge on the periphery of said picking portion and a generally transverse cotton gripping edge on said end surface, said indent diminishing in depth as it extends longitudinally from said end surface.

4. A cotton picking spindle comprising an elongated element of substantially uniform cylindrical cross section throughout its length and having a fluted picking portion terminating in an end surface extending at a right angle to said element, said end surface having a generally circular peripheral edge interrupted at only one portion thereof by an indent bordered by spaced side walls each having a cotton gripping edge on the periphery of said picking portion and a generally transverse cotton gripping edge on said end surface, said indent extending longitudinally of said picking portion to thereby define a pair of reinforced longitudinally extending cotton engaging members.

5. A cotton picking spindle comprising an elongated element of substantially uniform cylindrical cross section throughout its length and having a fluted picking portion terminating in an end surface extending at a right angle to said element, said end surface having a generally circular peripheral edge interrupted at only one portion thereof by an indent bordered by spaced, parallel extending side walls each having a cotton gripping edge on the periphery of said picking portion and a generally transverse cotton gripping edge on said end surface, said indent diminishing in depth as it extends longitudinally of said picking portion to thereby define a pair of reinforced longitudinally extending cotton engaging members.

References Cited in the file of this patent
UNITED STATES PATENTS

| | | |
|---|---|---|
| 502,241 | Todd | July 25, 1893 |
| 2,671,298 | Fergason | Mar. 9, 1954 |
| 2,699,638 | Rust | Jan. 18, 1955 |
| 2,700,864 | Fogle | Feb. 1, 1955 |